Patented Jan. 24, 1933

1,895,336

UNITED STATES PATENT OFFICE

JAMES MORTON, JAMES IVOR MORGAN JONES, AND BIRKETT WYLAM, OF LANCASTER, AND JOHN EDMUND GUY HARRIS, OF CARLISLE, ENGLAND, ASSIGNORS TO SCOTTISH DYES, LIMITED, OF GRANGEMOUTH, SCOTLAND

VAT DYESTUFF DERIVATIVES

No Drawing. Application filed August 10, 1925, Serial No. 49,454, and in Great Britain August 11, 1924.

This invention relates to the art of dyeing and the production of vat dyestuff derivatives and materials dyed with the same and has for its main object to provide improvements in dyes and dyeing and more particularly the manufacture and use in dyeing and printing of stable and soluble derivatives of the hereinafter-described vat dyestuffs. These derivatives are intended to be used for direct dyeing and printing of animal and vegetable fabrics.

Among the dyestuffs to be treated by the new process may be mentioned:—

Indigoid vat dyestuffs including indigo and dichlor-dibrom-indigo;

Anthraquinone vat dyestuffs including benzanthrone, indanthrone, flavanthrone, pyranthrone and anthraquinone acridone dyestuffs.

The invention consists in a process for the preparation of a dyeing compound according to which the dry dyestuff together with a suitable metallic powder is suspended in an organic tertiary base and refluxed for a suitable time after which the resulting mixture is cooled and treated with an alkyl sulphuric acid chloride.

The invention also consists in a process for the preparation of a dyeing compound according to which the dry dyestuff, together with zinc powder, is suspended in pyridine, then refluxed, and cooled and treated with methyl sulphuric acid chloride, the dyeing compound being extracted from the resultant mass by the addition of a limited quantity of water and subsequent filtration.

The invention also consists in a dyeing process according to which the solid product resulting from the above process is dissolved in a suitable solvent and the articles to be dyed immersed in the solution, then treated in a bath capable of regenerating the shade of the original dyestuff, for example a bath capable of causing mild hydrolysis and oxidation.

The invention also consists in processes for preparing and utilizing colouring matters as herein described and products when prepared by those processes.

Example 1

This deals with Caledon jade green, zinc dust, pyridine, methyl sulphuric acid chloride and prior heating.

In carrying the invention into effect in one form by way of example, all parts in this specification being parts by weight, 2 parts of pure dry Caledon jade green (dimethoxy-dibenzanthrone) are suspended in 30 parts of pure pyridine and 6 parts of zinc dust added. The mixture is then boiled under a reflux condenser for about 10 minutes. The mixture is then allowed to cool and to it is added drop by drop from a tap funnel 10 parts of pure methyl sulphuric acid chloride. A large amount of heat is evolved during this addition which may be spread over 10 to 15 minutes. The mixture is gently agitated while the ester is added. The reddish-brown paste resulting is poured into about 500 parts of water, whereby a bright red solution is formed and a quantity of dark red solid precipitated. The solution consists of a saturated solution of the reddish-brown solid and contains the bulk of the pyridine, which is removed by filtration. The reddish-brown solid may be dissolved in hot water or alkali and the resulting solution used for dyeing cotton, wool, natural and artificial silk. The parent dyestuff may be regenerated on the fabric by treatment with mild acid oxidizing agents, such as acid ferric chloride solution.

Example 2

This deals with Caledon red BN, zinc, pyridine, and methyl sulphuric acid chloride on the lines of Example 1.

Anthraquinone acridone vat dyestuffs may be treated on the lines of Example 1. In the case of Caledon red BN, (anthraquinone-1:2-naphthacridone) an orange solid is obtained.

Example 3

This deals with Caledon blue R and other indanthrones, zinc, pyridine and methyl sulphuric acid chloride on the lines of Example 1.

Indanthrone vat dyestuffs may be treated on the lines of Example 1. In the case of Caledon blue R (N-dihydro-1:2:1':2'-anthraquinone-azine) a dark red-violet compound is obtained.

Example 4

This deals with Caledon yellow G and other flavanthrones, zinc, pyridine and methyl sulphuric acid chloride as Example 1 to give the blue flavanthrone derivative.

Flavanthrone vat dyestuffs may be treated on the lines of Example 1. In the case of Caledon yellow G (flavanthrone) a dark blue solid is obtained, which is soluble in weak caustic soda solution to a blue-violet solution and dyes cotton or other fibres blue-violet shades, which with acid oxidizing agent may be developed to those of the original dyestuff.

Example 5

This deals with Brilliant indigo BASF 2B and other indigoid vat dyestuffs with zinc, pyridine and methyl sulphuric acid chloride on the lines of Example 1.

Indigoid vat dyestuffs may be treated on the lines of the dibenzanthrone dyestuff of Example 1 or Example 3. In the case of Brilliant indigo BASF 2B (4:4'-dichlor-7:7'-dibrom-indigo) a greenish-white solid is obtained.

Example 6

The crude products may be extracted with a dilute alkali followed by the salting out of a stable product, which contains sufficient of the free alkali as a rule to ensure the keeping properties of the dyestuffs, the products being generally speaking most stable in the presence of a little free alkali.

General

The invention is not limited to the use of zinc dust or methyl sulphuric acid chloride. Any suitable metallic dust such as copper, especially copper bronze, for instance, may be used and any other alkyl sulphuric acid chloride such as ethyl sulphuric acid chloride may be used. The organic base may be any suitable substance besides pyridine, for instance quinoline or dimethyl-aniline or a homologue or substitution product of this type of base. Among the substances which may be dyed effectively by the above process may be noted cotton, wool, natural and artificial silk and straw.

The dyeing compounds produced by the above-described process are in general stable to air, soluble in water and dilute alkali and in some cases are also soluble in dilute acids.

They may be used for printing and for the direct dyeing of fabrics.

As an example of a method of printing, 3 parts of the dry dyestuff derivative are made to a thin paste with 27 parts of a 5% caustic soda solution (or equivalent parts of a dyestuff paste may be used with a stronger soda solution) and then well mixed with 70 parts of a thickening containing 1 part of British gum to 1 part of water. The resulting paste is printed on textile materials in the usual manner, dried, steamed in a Mather & Platt or other steamer and treated with a bath of acid ferric chloride.

In connection with products which can be prepared by processes herein described, the following information is given.

*Indigo bodies.*—The solubility in cold water may be about 0.08 grammes per 100 ccs. of water. The analysis of the purified and crystallized product may be as follows:—

|  | Per cent |
|---|---|
| Indigo | 38.7 |
| Sulphur | 9.46 |
| Sodium | Nil |
| Sulphated ash | Nil |
| Carbon | 52.19 |
| Hydrogen | 5.11 |
| Nitrogen | 8.27 |
| Water 105–110° C | 6.0 |
| Atoms sulphur per molecule of indigo | 1.99 |

Apparently the indigo body is not a sodium salt, neither is it an alkyl ester of indigo sulphuric acid since this would yield a sodium salt and methyl alcohol on saponification. It appears to be in the nature of a quaternary alkyl pyridinium derivative when prepared with pyridine. Apparently it has the formula:—

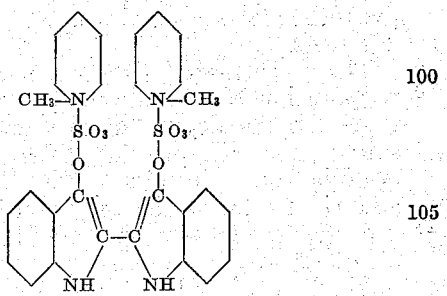

*Flavanthrone derivatives.*—A red substance can be produced from flavanthrone containing two atoms of sulphur per molecule and two atoms of sodium, namely a disodium salt of disulphuric acid ester of flavanthrone. The primary product of the reaction for the production of this red substance is practically insoluble in water and to obtain the disodium salt treatment with sodium hydroxide or the like is effected. The resulting product is then easily soluble. The primary product when pyridine has been employed appears to be a complex containing the pyridinium radicle which breaks down on treatment with alkali. In the decomposition of the primary product the pyridinium radicle is removed as a substance having a characteristic odour. The yellow body on treatment with mineral acid is converted into a blue-green variety, which on treatment with alkali turns purple, and in this treatment the red form loses half its sulphur content. The dark green product resulting loses on oxidation the rest of its sulphur with the regeneration of flavanthrone.

*Dimethoxy-dibenzanthrones.* — The condensation between dimethoxy-dibenzanthrone zinc and sulphuric acid chloride yields a primary product which is almost insoluble in cold water. From this primary product a jade green colouring matter may be extracted by means of a warm solution of sodium carbonate of 4% strength. A product may also be obtained by extraction with large amounts of boiling water. Both products on salting out are easily soluble in cold water and appear to contain two atoms of sulphur.

In the examples given above, reference has been made specifically to benzanthrone derivatives, indanthrone, flavanthrone, pyranthrone, anthraquinone-acridone, indigoid and indigo as types of vat dyestuffs.

The process of the invention is however general, and applicants know of no exception among the vat dyestuffs. In the examples given above the metal employed is zinc but metals selected from the following may be used in place thereof, namely, magnesium, aluminium, cadmium, iron, cobalt, tin, antimony and copper.

We claim:—

1. Products which may be prepared by a process which consists in heating together a vat dyestuff, a liquid tertiary organic base, a metal of the group consisting of magnesium, aluminium, zinc, cadmium, iron, cobalt, tin, antimony and copper and cooling the product and mixing it with an alkyl sulphuric acid halide.

2. A process for the production of derivatives of vat dyestuffs which consists in heating together a vat dyestuff, a liquid tertiary organic base, a metal of the group consisting of magnesium, aluminium, zinc, cadmium, iron, cobalt, tin, antimony and copper, cooling the product and mixing it with an alkyl sulphuric acid halide.

3. A process for the production of derivatives of vat dyestuffs which consists in suspending the aforesaid dry vat dyestuff in pyridine in the presence of a metal of the group consisting of magnesium, aluminium, zinc, cadmium, iron, cobalt, tin, antimony and copper, heating the mixture under reflux conditions, cooling the product, mixing it with alkyl sulphuric acid halide, adding a limited quantity of water and separating the residue from the liquor.

4. A process for the production of derivatives of vat dyestuffs which consists in suspending the aforesaid dry vat dyestuff in pyridine in the presence of a metal of the group consisting of magnesium, aluminium, zinc, cadmium, iron, cobalt, tin, antimony and copper, heating the mixture under reflux conditions, cooling the product, mixing it with methyl sulphuric acid chloride, adding a limited quantity of water and separating the residue from the liquor.

5. A process as claimed in claim 2, followed by treatment of the resulting solution with alkali, and isolation of the alkali salt thus formed.

6. Products which may be prepared by a process which consists in heating together a vat dyestuff, a liquid tertiary organic base, a metal of the group consisting of magnesium, aluminium, zinc, cadmium, iron, cobalt, tin, antimony and copper, cooling the product, mixing it with an alkyl sulphuric acid halide, extracting the primary product with alkali and isolating the alkali salt thus formed from the solution.

In testimony whereof we have signed our names to this specification.

JAMES MORTON.
JAMES IVOR MORGAN JONES.
BIRKETT WYLAM.
JOHN EDMUND GUY HARRIS.